United States Patent [19]

Carter et al.

[11] Patent Number: 5,916,705
[45] Date of Patent: Jun. 29, 1999

[54] FUEL CELL CATHODE TESTING DEVICE AND METHOD FOR USING THE SAME

[75] Inventors: Dennis L. Carter, Hudson; Dane W. Gregg, Hartville; James T. Frater, Akron, all of Ohio

[73] Assignee: Lockhead Martin Tactical Defense Systems, Inc., Akron, Ohio

[21] Appl. No.: 08/905,697

[22] Filed: Aug. 4, 1997

[51] Int. Cl.⁶ .............................. H01M 8/02; H01M 8/04
[52] U.S. Cl. .................................. 429/93; 429/13; 429/90
[58] Field of Search .................................... 429/34, 35, 36, 429/37, 90, 91, 92, 93; 204/424, 270

[56] References Cited

U.S. PATENT DOCUMENTS

| | | |
|---|---|---|
| 3,408,270 | 10/1968 | Gentile .................................. 204/153.1 |
| 4,019,129 | 4/1977 | Rau ............................................ 324/30 |
| 4,919,766 | 4/1990 | Kotowski et al. .................... 204/153.1 |
| 4,963,244 | 10/1990 | Kotowski et al. ....................... 204/400 |

*Primary Examiner*—Maria Nuzzolillo
*Assistant Examiner*—Mark Ruthkosky
*Attorney, Agent, or Firm*—Renner, Kenner, Greive, Bobak, Taylor & Weber

[57] ABSTRACT

An apparatus for testing the electrochemical performance of discrete areas of a cathode that is to be used in a fuel cell is presented. The apparatus tests a cathode which is retained and carried by a holding fixture wherein a chamber is formed between an underside of the cathode and the holding fixture to allow for passage of an oxidizing agent therethrough and wherein the holding fixture also provides for retention of electrolyte on the top side of the cathode. A probe, which is connected to the cathode, has an anode material that contacts the electrolyte but is spaced apart from the cathode. Placement of the anode in the electrolyte generates electrical power detected by a measuring device connected between the probe and the cathode. The probe provides a sealing surface to allow for testing of just discrete areas of the cathode to determine if there are any flaws in the manufacture of the cathode.

19 Claims, 1 Drawing Sheet

FUEL CELL CATHODE TESTING DEVICE AND METHOD FOR USING THE SAME

TECHNICAL FIELD

The present invention herein resides in the art of testing devices for fuel cell components. More particularly, the present invention relates to a device for testing the electrochemical performance of discrete areas of a cathode employed in a fuel cell. Specifically, the present invention relates to a movable probe that contains a recessed anode element to allow for observation of different areas of a cathode.

BACKGROUND ART

Fuel cells are known to employ a series of anodes and cathodes configured in a stack wherein exposure to an oxidizing agent and electrolyte generates electrical power. To ensure that an uninterrupted and steady flow of electrical power is generated, cathodes must be manufactured with uniform and optimum properties. Any defects in the cathode material or in sintered layers applied to the cathode material may result in defective areas of the cathode. These defects in turn cause mild to severe degradation of electrochemical performance which in turn causes reduced fuel cell performance or even fuel cell failure.

Previous cathode assurance tests consisted simply of visual inspection of the cathode or electrical resistance tests of just the cathode. Each of these test methods has inherent disadvantages. A visual test only allows for inspection of the outer surface of the cathode and does not allow for observation of the internal structure of the cathode. It will be appreciated that any structural flaws within the cathode material may greatly reduce the electrochemical performance of the fuel cell. An electrical resistance test only evaluates the cathode as a whole and does not take into consideration that individual or discrete areas of the cathode may be flawed and cause failure of the cathode and ultimately the fuel cell. Accordingly, none of the aforementioned tests reliably determine whether a cathode will meet the desired performance characteristics of the fuel cell.

It light of the foregoing it is evident there is a need in the art for a testing device that can accurately determine the electrochemical performance of a discrete area of a cathode used in a fuel cell. Moreover, there is a need in the art for a testing device that is movable to quickly analyze each of the desired discrete areas of the cathode.

DISCLOSURE OF INVENTION

In light of the foregoing, it is a first aspect of the present invention to provide a fuel cell cathode testing device and method for using the same.

Another aspect of the present invention is to provide a cathode testing device with a fixture for holding a cathode which forms a chamber adjacent one side of the cathode to allow for passage of an oxidizing gas and wherein the fixture also provides walls for maintaining an electrolyte material on an opposite side of the cathode.

Yet another aspect of the present invention, as set forth above, is to provide a testing fixture coupled to the holding fixture which provides a probe movable to various discreet areas on the electrolyte side of the cathode.

Still another aspect of the present invention, as set forth above, is to provide the probe with an anode material that is maintained in a substantially parallel and spaced apart relationship from the cathode with the electrolyte material therebetween.

A further aspect of the present invention, as set forth above, is to provide the probe with an insulator sleeve to hold the anode material, wherein the insulator sleeve has one end that provides a sealing surface that isolates the electrolyte material under the probe from the remaining electrolyte material.

Yet a further aspect of the present invention, as set forth above, is to provide an insulated sleeve which allows the electrolyte material to circulate through the volume under the anode material via holes through the insulated sleeve.

Still a further aspect of the present invention, as set forth above, is to provide a testing fixture which includes a load with at least a serially connected ammeter adjacent the load and/or a voltmeter connected across the load.

The foregoing and other aspects of the present invention which shall become apparent as the detailed description proceeds are achieved by a testing device for measuring the electrochemical performance of a cathode, comprising a holding fixture for carrying the cathode, wherein electrolyte is received within the holding fixture and exposed to one side of the cathode; and a testing fixture coupled to the cathode for selectively testing predetermined areas of the cathode exposed to the electrolyte.

Other aspects of the present invention are attained by an apparatus for testing the electrochemical performance of discrete areas of a cathode, comprising a holding fixture for carrying the cathode wherein a chamber is formed between an underside of the cathode and the holding fixture to allow passage of an oxidizing agent and electrolyte is carried by a top side of the cathode and the holding fixture; and a probe connected to the cathode, the probe having an anode contacting the electrolyte but spaced apart from the cathode, wherein contact with the electrolyte by the anode generates electrical power detected by a measuring device connected between the probe and the cathode.

Yet further aspects of the present invention are attained by a method for testing the electrochemical performance of a cathode employed in a fuel cell comprising the steps of securing a cathode within a holding fixture causing formation of a chamber to allow the flow of an oxidizing agent therethrough; depositing an electrolyte material on the cathode and within the holding fixture; connecting a test fixture to the cathode, wherein the test fixture provides a measuring device and a probe with an anode material carried therein; positioning the probe onto discrete areas of contact with the cathode; and detecting with the measuring device the electrochemical performance of the cathode.

BRIEF DESCRIPTION OF THE DRAWINGS

For a complete understanding of the objects, techniques and structure of the invention, reference should be made to the following detail description and accompanying drawings wherein.

BEST MODE FOR CARRYING OUT THE INVENTION

Figure 1:
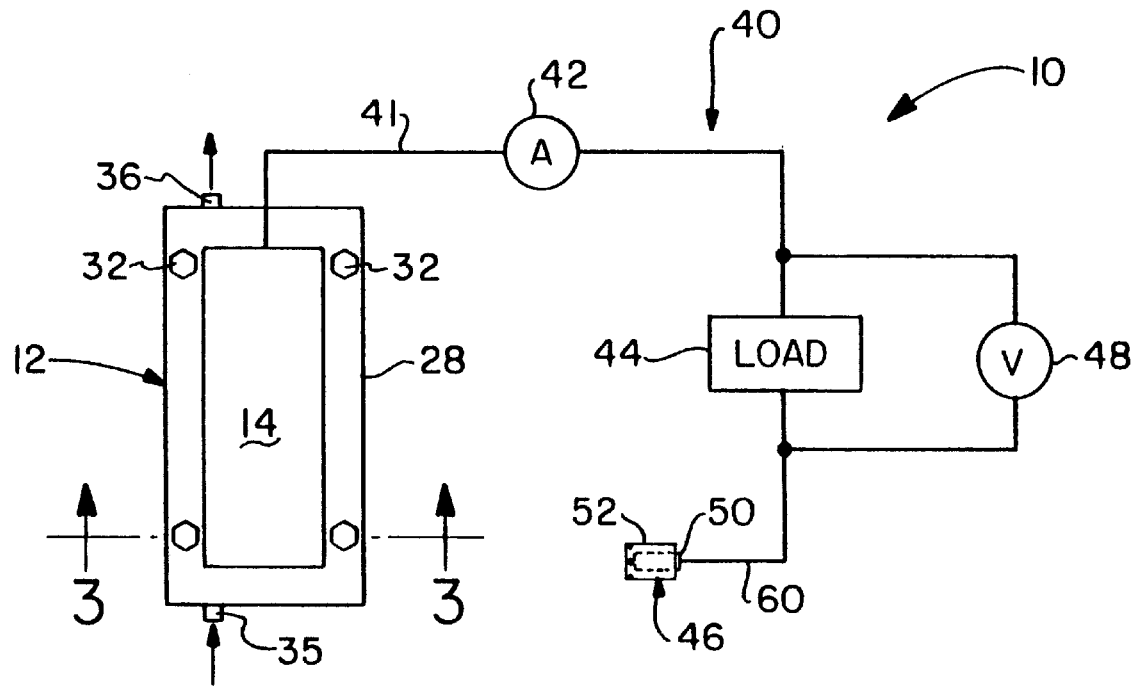
FIG. 1 is a schematic representation of a cathode testing device according to the present invention.

Referring now to the drawings, it can be seen that a cathode testing device according to the present invention, is designated generally by the numeral 10. As shown, the device 10 includes a holding fixture 12 for sealingly receiving a cathode 14 which may be provided with a sintered layer 16 that in the preferred embodiment is a primarily silver composition. The primary purpose of the cathode testing device 10 is to analyze individual cathodes 14 prior to their insertion into a fuel cell stack. As is well known, these fuel cell stacks may be employed for power generation in remote areas or to propel unmanned underwater vehicles. Fuel cells provide a reliable source of energy and performance after long periods of non-use. The cathode testing device 10 ensures that the cathodes employed are of reliable manufacture and meet the necessary performance requirements.

The holding fixture 12 includes a U-shaped base 22 with an upwardly extending support leg 24 around the periphery thereof. A recessed edge 26 is provided along the inner periphery of the top edge of the support leg 24 for receiving a bottom outer edge of the cathode 14. A clamp top 28 is coupled to the U-shaped base 22 for securing the cathode 14 within the holding fixture 12. The clamp top 28 includes a recessed edge 30 along an inner periphery of its bottom edge to secure the top edge of the cathode 14. A plurality of fasteners 32 are employed for securing the clamp top 28 to the U-shaped base 22 with the cathode 14 secured therebetween. In the preferred embodiment, the fasteners 32 may be threaded bolts which receive nuts; however, other fastening devices known in the art may be employed. Alternatively, the housing 12 may be a one-piece construction that sealingly receives the cathode 14.

Figure 3:
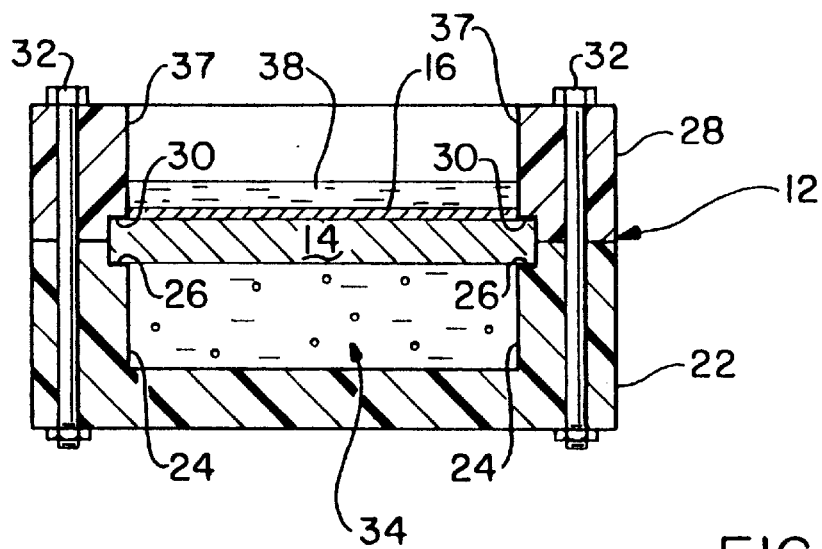
FIG. 3 is a schematic cross-sectional view taken along lines 3—3 of FIG. 1 of the present invention.

As best seen in FIG. 3, securement of the cathode 14 within the holding fixture 12 forms a chamber 34 between a bottom edge of the cathode and the U-shaped base 22. The chamber 34 allows for passage of an oxidizing agent such as oxygen or the chamber 34 may be opened to the atmosphere if the cathode 14 is an air cathode. The chamber 34 may be provided with an inlet 35 and an outlet 36 to pass the oxidizing agent past the cathode 14 in a manner which is representative of a fuel cell stack. Securement of the cathode 14 by the clamp top 28 also forms a wall 37 around the upper edge of the cathode 14. The wall 37 allows for an electrolyte material 38, such as potassium hydroxide, to be disposed on the top surface of the cathode 14. The electrolyte 38 is evenly distributed along the entire top surface of the cathode 14 and is provided with a predetermined depth.

A testing fixture 40 is coupled to the holding fixture 12 and in particular, the cathode 14. As will become apparent from the detailed description below, the testing fixture 40 is employed for selectively testing discrete areas of the cathode 14 to determine if there are manufacturing flaws or defects within or on particular areas of the cathode 14. A lead wire 41 is connected to the cathode 14 at one end and is connected to an ammeter 42 at its opposite end. Connected to the side opposite the lead wire 41, the ammeter 42 is connected to a load 44 which has a probe 46 connected at its opposite end. As will be discussed in further detail below, the probe 46 is employed to complete the electrical connection with the cathode 14 and to allow for evaluation of the cathode structure. A voltmeter 48 may be connected across the load 44 for measuring the voltage generated by the cathode 14 under test.

Figure 2:
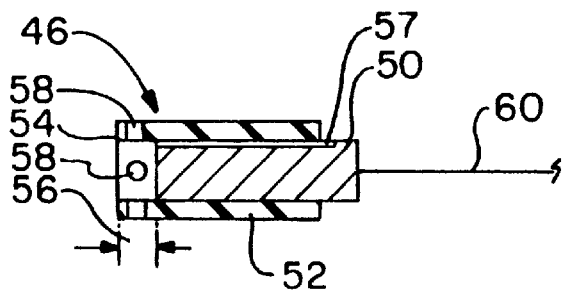
FIG. 2 is a schematic cross-sectional view of a probe employed in the present invention.

The probe 46 includes an anode 50, which is typically made of aluminum or other appropriate material, that is surrounded by an insulating sleeve 52. The insulating sleeve 52 securely holds the anode 50 to allow for movement of the probe 46 to different discrete areas along the top or electrolyte exposed surface of the cathode 14. The insulating sleeve 52 includes a sealing surface 54 at the bottom thereof which contacts the cathode 14 as the probe 46 is moved about. As can be seen from FIG. 2, the insulating sleeve 52 maintains the anode 50 in a substantially parallel relationship with the sealing surface 54 and thus the cathode 14. The sealing surface 54 also provides a gap 56 between the end of the probe 46 and the end of the anode 50. Those skilled in the art will appreciate that the gap 56 is of a dimension less than the predetermined depth of the electrolyte 38 disposed on the cathode 14. As such, the anode 50 maintains contact with the electrolyte 38 when the sealing surface 54 is placed upon the cathode 14. A vent aperture 57 may be provided between the anode 50 and the insulating sleeve 52. This allows any air bubbles captured within the gap 56 to escape and not interfere with testing of the cathode 14. The sealing surface 54 seals a volume of the electrolyte 38 under the probe 46 away from the remaining electrolyte. This facilitates testing in particular discrete areas of the cathode 14 to determine electrochemical performance. The insulating sleeve 52 may also be provided with flow through holes 58 to allow for flow of electrolyte material from the gap 56 to the other areas on the electrolyte surface of the cathode 14. Connected to the end of the anode 50 opposite the sealing surface 54 is a lead wire 60, the other end of which is connected to the load 44.

In use, an inspector can test the electrochemical performance of the cathode 14 that is to be employed in a fuel cell by first securing the cathode 14 within the respective recessed edges 26 and 30 of the base 22 and clamp top 28. By securing the cathode 14 in the holding fixture 12, the chamber 30 is formed to allow for passage of an oxidizing agent therethrough. Next, the inspector deposits the electrolyte 38 on the top surface of the cathode 14 wherein the electrolyte material is retained within the holding fixture 12 by the wall 37. Those skilled in the art will appreciate that the securing of the clamp top 28 to the U-shaped base 22 precludes leakage of any electrolyte 38 into the chamber 34.

The inspector next connects the test fixture 40 to the cathode 14. In particular, the lead wire 41 is connected to the cathode 14, wherein the other end of the lead wire 41 is connected to a load 44 with measuring devices 42 and 48 associated therewith. The lead wire 60 connects the other end of the load 44 to the probe 46. The inspector then positions the probe 46 by gripping with his or her hand the insulating sleeve 52 and moving the anode 50 to various discrete areas of the cathode 14. In particular, the inspector maintains the entire sealing surface 54 upon the surface of the cathode 14 which in turn allows detection of the electrochemical performance of the discrete area. The inspector positions the probe 46 onto a particular discrete area and then records the measurements generated by the ammeter 42 and the voltmeter 48. After these readings are taken, the inspector then moves the probe 46 to the next discrete area and repeats the measurement process. Of course, it will be appreciated that other variables, such as different electrolyte or anode material, may be introduced during the testing process to allow for a thorough inspection of the cathode 14 to determine its effectiveness. Upon completion of the testing, the inspector analyzes the recorded test data and determines whether the cathode is acceptable for use in a fuel cell stack. The inspector may also take any necessary corrective action to have the cathode 14 reworked so that it meets the necessary performance requirements.

Based upon the foregoing structure and method of use presented above, the cathode testing device 10 effectively analyzes and detects any defects within a cathode 14 prior to its inclusion in a fuel cell stack. One advantage of the present invention is that it allows for analysis of discrete areas of the cathode which heretofore have been unavailable. Still another advantage of the present invention is that is ensures, with minimal expense, that the cathode 14 is free from structural or manufacturing defects which may adversely affect the performance of the fuel cell stack in which the cathode 14 is employed. Still another advantage of the present invention is that the analysis can be quickly and easily completed. Still yet another advantage of the present invention is that any reoccurring defects in the cathodes can be relayed to the manufacture who may then refine their process to more consistently provide cathodes free from defect.

Thus it can be seen that the objects of the invention have been satisfied by the structure and use of the invention as presented above. While in accordance with the patent statutes, only the best mode and preferred embodiment of the invention have been presented and described in detail, it is to be understood that the invention is not limited thereto or thereby. Accordingly, for an appreciation of the true scope and breadth of the invention, reference should be made to the following claims.

What is claimed is:

1. A testing device for measuring the electrochemical performance of a cathode, comprising:

a holding fixture for carrying the cathode, wherein electrolyte is received within said holding fixture and exposed to one side of the cathode; and a testing fixture coupled to the cathode for selectively testing areas of the cathode exposed to the electrolyte.

2. The testing device according to claim 1, wherein said testing fixture comprises:

a probe having a sleeve for holding an anode in a spaced relation from the cathode while contacting the electrolyte; and at least one measuring device connected between the cathode and said probe.

3. The testing device according to claim 1, wherein said holding fixture comprises:

a base for supporting the cathode; and a clamp top coupled to said base with the cathode secured therebetween, said base and the cathode forming a chamber to allow passage of an oxidizing medium therethrough.

4. The testing device according to claim 1, further comprising:

a probe having a sleeve for holding an anode in a spaced relation from the cathode while contacting the electrolyte;

at least one measuring device connected between the cathode and said probe;

a base for supporting the cathode;

a clamp top coupled to said base with the cathode secured therebetween, said base and the cathode forming a chamber to allow passage of an oxidizing medium therethrough.

5. The testing device according to claim 4, wherein said sleeve has a sealing surface and said anode is maintained a distance from said sealing surface with said sealing surface placed in movable contact with the cathode, wherein the electrolyte is in contact with both the cathode and said anode and wherein said measuring device monitors the electrochemical performance of a discrete area of the cathode where the probe is placed.

6. The testing device according to claim 5, further comprising a load connected between said probe and the cathode wherein an ammeter is serially connected to said load and a voltmeter is connected across said load.

7. The testing device according to claim 5, wherein said base has upwardly extending support legs with a recessed edge around the inner periphery thereof for receiving an edge of the cathode and wherein said top clamp has a recessed edge around the inner bottom periphery thereof, and wherein a plurality of fasteners sealingly secure the cathode between said base and said top clamp to preclude entry of electrolyte into said chamber.

8. An apparatus for testing the electrochemical performance of discrete areas of a cathode, comprising:

a holding fixture for carrying the cathode wherein a chamber is formed between an underside of the cathode and said holding fixture to allow passage of an oxidizing agent and electrolyte is carried by a top side of the cathode and said holding fixture; and a probe connected to the cathode, said probe having an anode contacting said electrolyte but spaced apart from the cathode, wherein contact with the electrolyte by said anode generates electrical power detected by a measuring device connected between said probe and the cathode.

9. The apparatus according to claim 8, further comprising:

an insulating sleeve for carrying said anode, said sleeve having a sealing surface at one end thereof wherein said anode is spaced apart from said sealing surface a distance and said sealing surface contacts the cathode and precludes flow of said electrolyte from within said distance to outside of said insulating sleeve.

10. The apparatus according to claim 8, further comprising;

an insulating sleeve for carrying said anode, said sleeve having a sealing surface at one end thereof wherein said anode is spaced apart from said sealing surface a distance and said sealing surface contacts the cathode and allows the flow of said electrolyte from within said distance to outside of said insulating sleeve.

11. The apparatus according to claim 8, further comprising:

a load connected between said probe and the cathode wherein an ammeter is serially connected between said load and one of said probe and said cathode and wherein a voltmeter is connected across said load.

12. The apparatus according to claim 8, wherein the cathode is provided with a layer of sintered material.

13. The apparatus according to claim 8, further comprising:

an insulating sleeve for carrying said anode, said sleeve having a sealing surface at one end thereof wherein said anode is spaced apart from said sealing surface and wherein a vent aperture is provided between said anode and said sleeve.

14. A method for testing the electrochemical performance of a cathode employed in a fuel cell comprising the steps of:

securing a cathode within a holding fixture causing formation of a chamber to allow the flow of an oxidizing agent therethrough;

depositing an electrolyte material on said cathode and within said holding fixture;

connecting a test fixture to said cathode, wherein said test fixture provides a measuring device and a probe with an anode material carried therein;

positioning said probe onto discrete areas of contact with said cathode; and detecting with said measuring device the electrochemical performance of said cathode.

15. The method according to claim 14, further comprising the steps of positioning said anode material within an insulated sleeve which has a sealing surface, wherein a gap is provided between an end of said anode material and said sealing surface; and placing said sealing surface upon said cathode with electrolyte therebetween.

16. The method according to claim 15, further comprising the step of connecting a load between said probe and said cathode.

17. The method according to claim 16, further comprising the steps of:

connecting an ammeter between said load and one of said probe and said cathode; and observing the reading of said ammeter with said probe in different positions upon said cathode.

18. The method according to claim 16, further comprising the steps of:

connecting a voltmeter across said load; and observing the reading of said voltmeter with said probe in different positions upon said cathode.

19. The method according to claim 16, further comprising the step of providing said cathode with a sintered layer.

* * * * *